Sept. 14, 1965 J. M. WIER 3,206,677

UNIDIRECTIONAL CIRCUIT PATHS TO UTILIZE BIPOLAR SIGNALS TO ENERGIZE AND CONTROL THE OUTPUT OF FREQUENCY GENERATION CIRCUITS

Filed Aug. 30, 1960 2 Sheets-Sheet 1

INVENTOR
J. M. WIER
BY John K. Mullarney
ATTORNEY

INVENTOR
J. M. WIER
BY
John K. Mullarney
ATTORNEY

United States Patent Office 3,206,677
Patented Sept. 14, 1965

3,206,677

UNIDIRECTIONAL CIRCUIT PATHS TO UTILIZE BIPOLAR SIGNALS TO ENERGIZE AND CONTROL THE OUTPUT OF FREQUENCY GENERATION CIRCUITS

Joseph M. Wier, Scotch Plains, N.J., assignor to Bell Telephone Laboratories, Incorporated, New York, N.Y., a corporation of New York Filed Aug. 30, 1960, Ser. No. 52,960
15 Claims. (Cl. 325—141)

This invention relates to the transmission of data and in particular to binary data transmitters for telephone lines.

In present day systems for transmitting binary data over telephone lines, a terminal transmitter is required for translating data signals into binary signals of satisfactory form for transmission over such lines. There are admittedly many arrangements well known in the prior art for providing terminal data transmitters, but such arrangements have proven heretofore to be either to expensive, too complicated in circuitry, or unduly demanding in maintenance and power requirements for economical operation. For example, most present day data transmitters require external direct current power supplies of one type or another. If batteries are utilized, they must be periodically checked and recharged, whereas if a direct current generator is resorted to, it must be continually inspected and maintained.

Accordingly, a primary object of the present invention is to eliminate the need for external power supplies in data transmitter systems.

Another object of the present invention is to provide simple and inexpensive data transmitters capable of sending data signals over standard telephone lines at a rate equal to the maximum rate such lines are capable of handling.

Further objects of the present invention are to reduce the size, cost, maintenance, circuit complexity, and power requirements of data transmitters.

The foregoing objects are attained in accordance with the present invention by the novel combination of conventional oscillator circuitry and diode switching paths therefor. The diode switching paths serve to connect bipolar data signals to the oscillator circuitry in a manner such that said bipolar signals provide the power necessary to operate said oscillator circuitry. The diode switching paths further serve to switch the generated oscillations to the output circuit in a manner such as to provide binary signals.

In one embodiment of the present invention, a pair of diode switching paths interconnect a bipolar signal source to a single transistor oscillator circuit, the latter being powered, as mentioned above, by the bipolar signal source. The transistor oscillator circuit provides a continuous carrier signal which is coupled to and decoupled from an output circuit by the diode switching paths in dependence on the instantaneous polarity of the bipolar input signal.

Another embodiment of the present invention utilizes two transistor oscillator circuits interconnected to the bipolar signal source by diode switching paths so as to provide two carrier signals. The diode switching paths in this embodiment couple one or the other oscillator circuits to the output circuit in dependence on the instantaneous polarity of the bipolar input signal to achieve frequency shift modulation representative of the binary data information.

A further embodiment of the present invention similarly achieves frequency shift modulation by utilizing one transistor to provide the common amplifying means for two oscillator tank circuits which are interconnected to the bipolar signal source and the output circuit by the diode switching paths. The frequency shift operation is carried out by the diode switching paths which switch the transistor amplifying means from one tank circuit to the other in dependence on the instantaneous polarity of the bipolar input signal.

Other objects and features of the invention will be more easily understood from the following detailed description when considered in connection with the accompanying drawings wherein.

Before proceeding to consider these embodiments in detail, it will prove helpful to consider the nature of the input signals containing the data to be transmitted. A bipolar signal source 11, of FIGS. 1, 2, and 3, produce representative sequences of typical data signals S which are bipolar in form, that is, one binary state is represented by a positive voltage while the other binary state is represented by a negative voltage. Such bipolar signals may originate, for example, from information record devices such as punched cards or punched paper tape. Whatever their original source may be, the signals are presented to the transmitter in the form of pulse-like, bipolar electrical signals. The conversion of record information into pulse-like bipolar electrical signals for presentation to the transmitter is conventional practice in the data transmission art.

Figure 1:
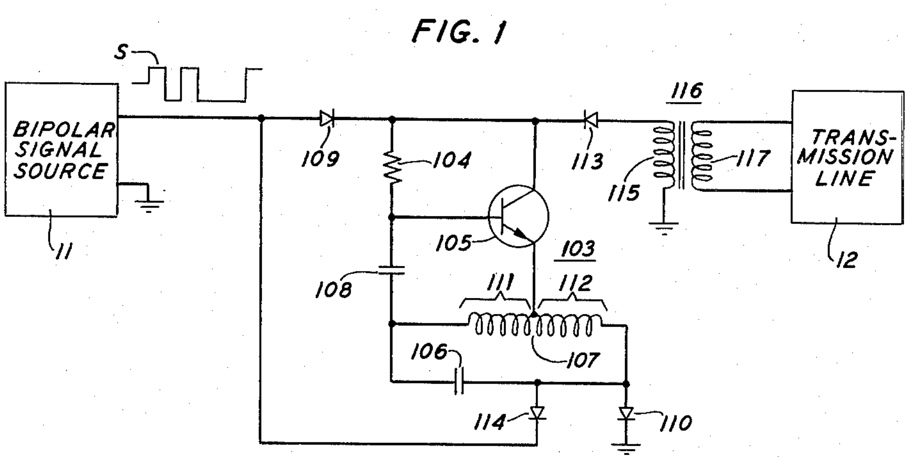
FIG. 1 is a schematic drawing of an amplitude modulated, binary data transmitter using a single transistor in accordance with the principles of the present invention.

Referring now to the drawings and, more particularly, to FIG. 1 thereof, the circuit shown is that of an amplitude modulated data transmitter in which a standard transistorized Hartley type oscillator circuit is employed in accordance with the principles of the present invention to provide a transmission carrier signal of the desired frequency. The transistor 105 is of the NPN type connected in the oscillator circuit 103 in common collector configuration. The frequency of oscillation is determined by the oscillator tank circuit composed of capacitor 106 in parallel with inductor 107 which is connected to the emitter of transistor 105 by means of a tap connection located on inductor 107.

The operation of Hartley type transistor oscillator circuits is well known and has been treated extensively in the literature (see, for example, Transistor Physics and Circuits, by Riddle and Ristenbatt, Prentice Hall, pages 348 through 353, and Transistor Electronics, by Lo et al., Prentice Hall, pages 374 through 382). Briefly, when a positive voltage is applied to the collector of NPN transistor 105 and to the base via resistor 104, the emitter-base junction of transistor 105 is forward biased, and the collector-base junction is back biased. Thus transistor 105 is properly biased for conventional amplifier operation. Inductor 107 functions as an autotransformer to provide the regenerative feedback necessary for oscillatory operation. The common collector configuration produces no phase reversal, and hence, an in-phase signal must be fed back to the base. To this end, the feedback voltage is obtained across winding 111 of inductor 107 and is coupled through capacitor 108 to the base of transistor 105 to sustain oscillations. An amplified oscillatory signal appears at the collector terminal of transistor 105 by operation of the amplifying action of transistor 105. The frequency of this amplified signal is determined by the parameters of the oscillator tank circuit.

As previously stated, the oscillator circuitry in each of the transmitters is powered by the bipolar signal source 11. This is accomplished in the circuit shown in FIG. 1 by two diode switching paths which couple the bipolar signal source to the oscillator circuit. The first diode switching path comprises diodes 109 and 110. The anode of diode 109 is connected directly to the bipolar signal source 11, while its cathode is connected directly to the collector of transistor 105 and to the base via resistor 104. The diode 110 is connected at its anode to the oscillator tank circuit and at its cathode to ground. Thus, when the bipolar input signal is at a positive polarity, the diode 109 is driven to conduction, a forward-biasing positive voltage is applied to the transistor base, and a reverse-biasing positive voltage is applied to the collector. The transistor 105 is thus properly biased for amplification, and hence, sustained oscillations are generated. The diode 110 completes the direct current path which also includes diode 109, transistor 105, and winding 112 of inductor 107.

The second diode switching path comprises diodes 113 and 114. The anode of diode 113 is connected to ground through primary winding 115 of output transformer 116. The cathode of diode 113 is connected directly to the collector of transistor 105 and to the base via resistor 104. The anode of diode 114 is connected to the oscillator tank circuit, while its cathode is connected directly to the bipolar signal source. The complete direct current path comprises winding 115, diode 113, transistor 105, winding 112 of inductor 107, and diode 114. When the bipolar input signal is of reverse or negative polarity, the diodes 113 and 114 are driven to conduction, a forward-biasing voltage is applied to the transistor base-emitter path, and a reverse-biasing voltage is applied to the collector-base path. Thus, transistor 105 is again properly biased for amplification, and hence, sustained oscillations are generated.

It should be recognized that in both of the above-recited modes of operation, the base is biased positively (i.e., forward-biased) with respect to the emitter and negatively (i.e., reverse-biased) with respect to the collector for conventional amplifier operation. Thus, the oscillator circuit continuously oscillates in the same manner during both modes of operation. When the bipolar input signal changes from positive to negative polarity or vice versa, interruptions and discontinuities in the generated oscillations are prevented by the well known flywheel-like inertia of the oscillator tank circuit.

The carrier generated by the oscillator circuit in FIG. 1 is modulated by the action of the switching path formed by diodes 113 and 114 in coupling and decoupling the oscillator circuit to the transmission line. The primary winding 115 of output transformer 116 is connected in the switching path of diodes 113 and 114 between ground and the anode of diode 113, as shown in FIG. 1. The secondary winding 117 of the transformer 116 is connected to the transmission line 12. Therefore, when the diodes 113 and 114 of the second switching path are rendered conductive in response to a negative input signal from the bipolar source, the primary winding 115 is coupled to the collector of the transistor 105, and the oscillatory energy at said collector is delivered to the transmission line 12 via output transformer 116. No oscillations are delivered to the transmission line when the bipolar input is positive because the diode 113 is back-biased during positive input signals thereby decoupling the primary winding 115 from the collector. Thus, the bipolar data signals are represented on the transmission line by a carrier signal for the negative binary state and by no carrier signal for the positive binary state. It will be obvious to one skilled in the art that the alternative representation of the data on the transmission line can be easily attained, that is, the presence of a carrier signal can be made to represent the positive binary state, and the lack of a carrier signal made to represent the negative binary state, by connecting the output transformer into the switching path of diodes 109 and 110 instead of the switching path of diodes 113 and 114.

Figure 2:
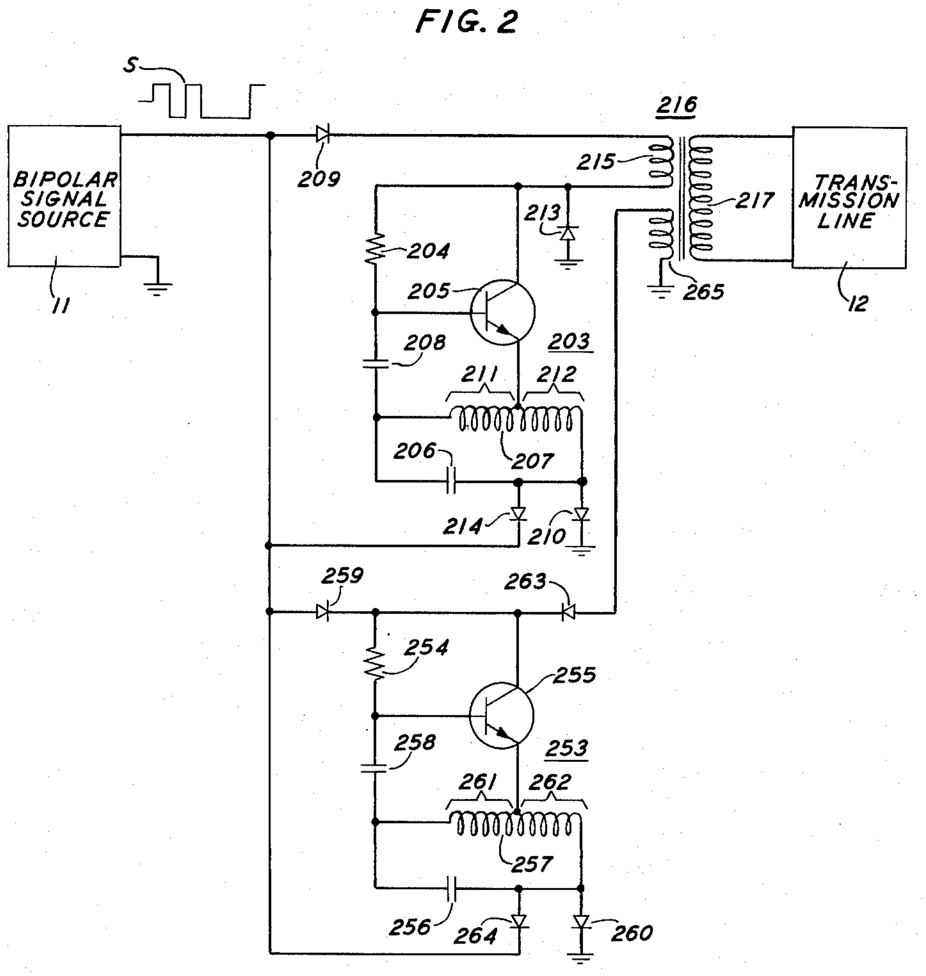
FIG. 2 is a schematic drawing of a frequency modulated, binary data transmitter using two transistors in a double oscillator configuration in accordance with the principles of the present invention.

Turning now to FIG. 2, the circuit shown is that of a data transmitter in which two Hartley type transistor oscillator circuits 203 and 253 are employed to provide two transmission carriers of different frequencies for frequency shift operation. The chief advantage of this embodiment is that it achieves frequency modulated transmission of the data information, a mode of transmission which is particularly desirable in certain instances.

The operation of the circuit of FIG. 2 will be made more clear if the total circuit is recognized as being composed of two circuits of the type shown in FIG. 1, discussed above. Like oscillator circuit 103 of FIG. 1, oscillator circuits 203 and 253 each comprise a single NPN transistor connected in common collector configuration and a frequency determining tank circuit. The tank circuit of oscillator circuit 203 is composed of capacitor 206 and inductor 207, while the tank circuit of oscillator circuit 253 is composed of capacitor 256 and inductor 257. The regenerative feedback voltage is obtained in oscillator circuit 203 from windings 211 of inductor 207 which is coupled through capacitor 208 to the base of transistor 205, and in oscillator circuit 253 from windings 261 of inductor 257 which is coupled through capacitor 258 to the base of transistor 255. Now, if the parameters of these two tank circuits differ, an oscillatory signal of one frequency will appear at the collector terminal of transistor 205, while an oscillatory signal of a different frequency will appear at the collector terminal of transistor 255.

Like the oscillator circuit 103 of FIG. 1, oscillator circuits 203 and 253 of FIG. 2 are each coupled to the bipolar signal source 11 by a pair of diode switching paths. The first diode switching path of oscillator 203 comprises diodes 209 and 210. The anode of diode 209 is connected directly to the bipolar signal source 11, while its cathode is connected through primary winding 215 of output transformer 216 to the collector of transistor 205 and to the base via resistor 204. The anode of diode 210 is connected to the oscillator tank circuit, while its cathode is connected directly to ground. As in the embodiment of FIG. 1, when the bipolar input signal is at a positive polarity, diodes 209 and 210 are driven to conduction, and transistor 205 is properly biased for amplification. Hence, oscillations are generated in oscillator circuit 203.

The second diode switching path of oscillator circuit 203 comprises diodes 213 and 214. The anode of diode 213 is connected directly to ground, while its cathode is connected directly to the collector of transistor 205 and to the base of said transistor via resistor 204. The anode of diode 214 is connected to the oscillator tank circuit, while its cathode is connected directly to the bipolar signal source. When the bipolar input signal is at a negative polarity, diodes 213 and 214 are driven to conduction and transistor 205 is again properly biased for amplification. Accordingly, sustained oscillations are generated in oscillator circuit 203.

The first diode switching path of oscillator circuit 253 comprises diodes 259 and 260. This switching path serves to channel bipolar input signals of positive polarity to oscillator circuit 253 in the same manner as the first switching path of oscillator circuit 203, thereby causing oscillations to be generated in oscillator circuit 253.

Similarly, bipolar input signals of negative polarity are channeled to oscillator circuit 253 by the second diode switching path associated therewith which comprises diodes 263 and 264, and hence sustained oscillations are generated in oscillator circuit 253.

It should be recognized that regardless of the polarity of the input signal, a voltage is continuously supplied to oscillator circuits 203 and 253 in the proper relative polarity for continuous oscillation of both circuits, thereby making available two carrier signals of different frequencies.

Frequency shift modulation is accomplished in the embodiment of FIG. 2 by the action of the switching path of diodes 209 and 210 and the switching path of diodes 263 and 264. The primary winding 215 of output transformer 216 is connected in the switching path of diodes 209 and 210. When the bipolar input signal is positive, this path is effectively a closed circuit and the oscillatory energy from oscillator circuit 203 which appears at the collector of transistor 205 is delivered to the transmission line 12 via the output transformer 216. However, when the bipolar input signal is negative, oscillatory energy from oscillator circuit 203 is prevented from flowing through winding 215 by the blocking action of diode 209 which is back-biased during said negative input.

Oscillator circuit 253 is coupled to the transmission line through primary winding 265 which is connected in the switching path comprising diodes 263 and 264. When the bipolar input signal is negative, this switching path is effectively a closed circuit and oscillatory energy generated by oscillator 253 which appears at the collector of transistor 255 is delivered to the transmission line 12 via output transformer 216. Oscillatory energy from oscillator circuit 253 is prevented from flowing through primary winding 265 during positive input signals by the blocking action of diode 263 which is back-biased during positive inputs.

Thus, in the embodiment of FIG. 2, the positive binary state is represented on the transmission line by a carrier signal generated by oscillator circuit 203, and the negative binary state is represented on the transmission line by a different carrier signal generated by oscillator circuit 253.

Figure 3:
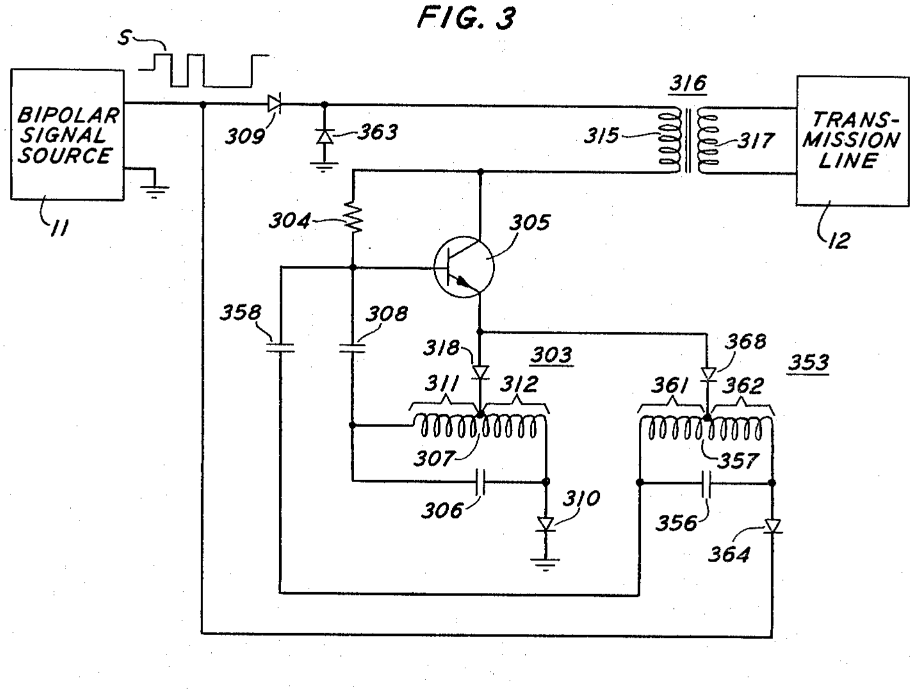
FIG. 3 is a schematic drawing of a frequency modulated, binary data transmitter using a single transistor in a double oscillator tank circuit configuration.

Turning now to FIG. 3, the circuit shown is that of a data transmitter employing, in effect, two Hartley type transistor oscillator circuits to provide two carriers of different frequencies for frequency shift operation. A further advantage of this embodiment is that it utilizes a single transistor as a common amplifying means for both oscillator circuits. The transistor 305 is of the NPN type connected in the oscillator circuits 303 and 353 in common collector configuration. The tank circuit composed of inductor 307 and capacitor 306 determines the frequency of oscillation of oscillator circuit 303, and the tank circuit composed of inductor 357 and capacitor 356 determines the frequency of oscillation of oscillator circuit 353. The emitter of transistor 305 is connected through diode 318 to a tap on inductor 307 and through diode 368 to a tap on inductor 357. The regenerative feedback for oscillator circuit 303 is obtained from winding 311 of inductor 307 coupled through capacitor 308 to the base of transistor 305. Similarly, the regenerative feedback for oscillator circuit 353 is obtained from winding 361 of inductor 357 coupled through capacitor 358 to the base of transistor 305. Oscillatory energy appears at the collector terminal of transistor 305 by conventional operation of the amplifying action of transistor 305.

The bipolar signal source 11, in the embodiment of FIG. 3 is coupled to the transistor 305 by a pair of diode switching paths. The first diode switching path comprises diodes 309 and 310. The anode of diode 309 is connected directly to the bipolar signal source, while its cathode is connected through primary windings 315 of output transformer 316 directly to the collector of transistor 305 and to the base through resistor 304. The anode of diode 310 is connected to the tank circuit of oscillator 303 and the cathode is connected directly to ground. The complete direct current path comprises diode 309, primary winding 315, transistor 305, diode 318, winding 312 of inductor 307, and diode 310. When the bipolar input signal is positive, diodes 309, 318, and 310 are driven to conduction and transistor 305 is coupled to the tank circuit comprising inductor 307 and capacitor 306 such that oscillator circuit 303 is completed. Further, transistor 305 is properly biased for amplifying operation, and hence, sustained oscillations are generated in oscillator circuit 303. During this period of time, the tank circuit of oscillator circuit 353 remains in a quiescent state disconnected from transistor 305.

The second diode switching path comprises diodes 363 and 364. The anode of diode 363 is connected directly to ground, while the cathode is connected through primary windings 315 directly to the collector of transistor 305 and to the base through resistor 304. The anode of diode 364 is connected to the tank circuit of oscillator 353, while its cathode is connected directly to the bipolar signal source 11. The complete direct current path comprises diode 363, primary windings 315, transistor 305, diode 368, windings 362 of inductor 357, and diode 364. When the bipolar input signal is negative, diodes 364, 368, and 363 are driven to conduction and transistor 305 is now coupled to the tank circuit comprising inductor 357 and capacitor 356 such that oscillator circuit 353 is completed. Transistor 305 is again properly biased for amplifying operation, and sustained oscillations are generated in oscillator circuit 353. In this case, the tank circuit of oscillator circuit 303 remains in a quiescent state disconnected from transistor 305. Diodes 318 and 368 serve to insure the isolation of the quiescent tank circuit from the transistor amplifying means while the other tank circuit is active, thereby preventing spurious oscillations from being generated by the quiescent tank circuit.

Frequency shift modulation is accomplished in the FIG. 3 embodiment by operation of the switching path of diodes 309 and 310 and the switching path of diodes 363 and 364. When the input signal is positive, oscillations generated by oscillator circuit 303 which appear at the collector terminal of transistor 305 are delivered to the transmission line 12 via windings 315 of output transformer 316. When the input signal is negative, oscillations generated by oscillator circuit 353 which appear at the collector terminal of transistor 305 are similarly delivered to the transmission line 12 via windings 315 of output transformer 316. Thus the positive binary state is represented on the transmission line by a carrier signal generated by oscillator circuit 303, and the negative binary state is represented on the transmission line by a different carrier signal generated by oscillator circuit 353.

It should be understood, of course, that the above-described embodiments are only illustrative of the application of the principles of the invention. One skilled in the art may desire to use PNP transistors in lieu of NPN transistors in which case all of the diodes would be reversed in polarity. Or it may be desirable to employ an oscillator circuit other than a Hartley type circuit. Further, it may be desirable to provide some type of amplitude limiting means such as a Zener diode connected across the tank circuits. Accordingly, it will be clear that numerous other embodiments and modifications may be devised by those skilled in the art without departing from the spirit and scope of the invention.

What is claimed is:

1. A data transmitter comprising a bipolar signal source, a first oscillatory circuit means including a transistor driven by the output of said signal source, a second oscillatory circuit means also including a transistor driven by the output of said signal source, a pair of first diode switching paths respectively interposed between said signal source and each of said oscillatory means for directing signals of one polarity to each of said oscillatory means, a pair of second diode switching paths respectively interposed between said signal source and each of said oscillatory means for directing signals of the opposite polarity to each of said oscillatory means, an output circuit for oscillatory energy, the first switching path interposed between said signal source and said first oscillatory means including an inductive coupling for coupling oscillatory energy from said first oscillatory means to said output circuit which coupling is actuated by signals of said one polarity from said signal source, and the second switching path interposed between said signal source and said second oscillatory means including an inductive coupling for coupling oscillatory energy from said second oscillatory means to said output circuit which coupling is actuated by signals of said opposite polarity from said signal source.

2. A data transmitter as defined in claim 1 wherein the first oscillatory circuit means oscillates at one predetermined frequency and the second oscillatory circuit means oscillates at another predetermined frequency.

3. In combination, a bipolar energy source, frequency generation means, said frequency generation means including input and output means, separate unidirectional circuit connection means to alternately connect each polarity of said bipolar energy to the input of said frequency generating means, alternately operable output means connected in at least one of said unidirectional circuit connection means, said frequency generation means comprising a first oscillation means continuously energized at a first preselected frequency and second oscillation means continuously energized at a second preselected frequency, said output means being individual to each of said oscillatory means, and means responsive to said bipolar energy source to selectively disable said output means.

4. In combination, a bipolar signal source, oscillatory means including a first terminal and a second terminal, means to utilize said signal source as the sole energy source applied to said oscillatory means, said utilization means comprising two unidirectional conduction paths connected between said signal source and said first terminal, said paths being selectively and alternately operable in dependence on the polarity of said signal source, and an output circuit for oscillation energy, and means to exclude selected oscillations generated by said oscillatory means from said output circuit, said excluding means being connected between said second terminal and said output circuit, and said excluding means being responsive to the polarity of said signal source.

5. The combination claimed in claim 4 wherein said oscillatory means comprises a first amplification device including input and output means, a first frequency determining circuit connected in circuit with said first amplification device, a second amplification device including input and output means, a second frequency determining circuit connected in circuit with said second amplification device, said first terminal comprising the input means of both said first and second amplification devices, said second terminal comprising the output means of both said first and second amplification devices, and said excluding means alternately disabling the output means of said first and second amplification devices.

6. The combination claimed in claim 4 wherein said oscillatory means comprises at least one amplification device including input and output means, a first frequency determining circuit connected in circuit with said amplification device, a second frequency determining circuit connected in circuit with said amplification device, said first terminal comprising the input means of said amplification device, said second terminal comprising the output means of said amplification device, and said excluding means disabling the circuit connection of one of said first and second frequency determining circuits.

7. The combination claimed in claim 4 wherein said oscillatory means comprises amplification means including input and output means, frequency determining means connected in circuit with said amplification means, said first terminal including the input means of said amplification means, said second terminal including the output means of said amplification means, and said excluding means selectively disabling said output means.

8. A binary data transmitter comprising an oscillator including at least a pair of terminals for applying direct current operating potential thereto and for deriving oscillatory output signals therefrom, a source of bipolar intelligence signals, an output circuit for utilizing said oscillatory signals, a first unidirectional conduction path connecting said source, said pair of terminals and said output circuit in a series circuit for conduction of direct current of one polarity, and a second unidirectional conduction path alternately operable to said first unidirectional conduction path and connecting said source and said pair of terminals in a series circuit for conduction of direct current of the opposite polarity.

9. The binary data transmitter as claimed in claim 8 wherein said oscillator comprises a first amplification device having input and output means comprising said pair of terminals, a second amplification device having input and output means comprising said pair of terminals, a first frequency determining circuit connected in circuit with said first amplification device, a second frequency determining circuit connected in circuit with said second amplification device, and means to selectively disconnect said output means of both said amplification devices from said output circuit in response to said bipolar intelligence signals.

10. The binary data transmitter as claimed in claim 8 wherein said oscillator comprises at least one amplification device having input and output means comprising said pair of terminals, a first frequency determining circuit connected in circuit with said amplification device, a second frequency determining circuit connected in circuit with said amplification device, and means to selectively disconnect said output means of said amplification device from said output circuit in response to said bipolar intelligence signals.

11. The binary data transmitter as claimed in claim 8 wherein said oscillator comprises amplification means having input and output means, frequency determining means connected in circuit with said amplification means and means to selectively disconnect said output means of said amplification means from said output circuit in response to said bipolar intelligence signals.

12. A binary data transmitter comprising an oscillator including an amplifying device having an input electrode and an output electrode, a source of bipolar signals, first alternately operable unidirectional coupling means coupling said bipolar source to said input and output electrodes to provide operating potential thereto, an output circuit, and second alternately operable unidirectional coupling means coupling said output electrode to said output circuit, said first and second unidirectional coupling means being poled in the same direction with respect to said source of bipolar signals.

13. A binary data transmitter as claimed in claim 12 wherein said oscillator further includes a first frequency determining circuit connected in circuit with said amplifying device, a second frequency determining circuit connected in circuit with a second amplifying device having an input electrode and an output electrode, means to utilize said first unidirectional coupling means to couple said bipolar source to said input electrode of said second amplifying device, means to utilize said second unidirectional coupling means to couple said output electrode of said second amplifying device to said output circuit, and means to selectively and alternately disable said first and second unidirectional coupling means in response to said bipolar signals.

14. A binary data transmitter as claimed in claim 12 wherein said oscillator further includes a first frequency determining circuit connected in circuit with said amplifying device, a second frequency determining circuit connected in circuit with said amplifying device, and means to selectively and alternately disable said first and second unidirectional coupling means in response to said bipolar signals.

15. A binary data transmitter as claimed in claim 12 wherein said oscillator further includes frequency determining means connected in circuit with said amplifying device and means to selectively and alternately disable said first and second unidirectional coupling means in response to said bipolar signals.

References Cited by the Examiner

UNITED STATES PATENTS

| | | | |
|---|---|---|---|
| 2,494,321 | 1/50 | Usselman | 178—66 |
| 2,636,941 | 4/53 | Singel et al. | 178—66 |
| 2,810,080 | 10/57 | Trousdale | 307—88.5 |
| 2,905,835 | 9/59 | Wray | 331—117 |
| 2,930,991 | 3/60 | Edwards | 325—30 |

DAVID G. REDINBAUGH, *Primary Examiner.*